United States Patent
Mendelson et al.

(10) Patent No.: US 7,310,629 B1
(45) Date of Patent: Dec. 18, 2007

(54) METHOD AND APPARATUS FOR CONTROLLING FILE SHARING OF MULTIMEDIA FILES OVER A FLUID, DE-CENTRALIZED NETWORK

(75) Inventors: Jordan Mendelson, San Francisco, CA (US); Shawn Fanning, San Francisco, CA (US)

(73) Assignee: Napster, Inc., San Jose, CA (US)

(*) Notice: Subject to any disclaimer, the term of this patent is extended or adjusted under 35 U.S.C. 154(b) by 255 days.

(21) Appl. No.: 10/115,714

(22) Filed: Apr. 3, 2002

Related U.S. Application Data

(63) Continuation-in-part of application No. 10/025,443, filed on Dec. 19, 2001, now Pat. No. 7,165,071, and a continuation-in-part of application No. 09/560,106, filed on Apr. 28, 2000, now Pat. No. 6,742,023, which is a continuation of application No. 09/464,653, filed on Dec. 15, 1999, now Pat. No. 6,366,907.

(51) Int. Cl.
*G06F 7/00* (2006.01)
*G06F 17/30* (2006.01)
*H04L 9/00* (2006.01)

(52) U.S. Cl. .............................. 707/3; 707/10; 713/156
(58) Field of Classification Search .................... 707/3, 707/10, 6; 713/100, 156, 176
See application file for complete search history.

(56) References Cited

U.S. PATENT DOCUMENTS 4,506,387 A   3/1985   Walter .......................... 455/612

(Continued)

OTHER PUBLICATIONS

Warwick Ford (1995), Advances in public-key certificate standards, pp. 9-15.*

(Continued)

*Primary Examiner*—Don Wong
*Assistant Examiner*—Merilyn P Nguyen
(74) *Attorney, Agent, or Firm*—Martine Penilla & Gencarella, LLP

(57) ABSTRACT

Communication is established between a first client and a central index server in a fluid, de-centralized network. The central index server searches the memory of the first client for usable data files which lack authentication certificates issued by the central index server. A data-file identifier is generated for a first data file among the select files lacking authentication certificates within the first client. The data-file identifier is compared to a reliable identifier in a main data base of the central index server. The reliable identifier is indexed within the main data base against a first unique reference ID. If the data-file identifier matches the reliable identifier, a valid authentication certificate is issued to the first data file in the first client. An IP address of the first client is then referenced against the first unique reference ID within the main data base of the central index server. When file request is received from a second client for a file represented by the first unique reference ID, a connection is facilitated between the first client and the second client so that the authenticated first multimedia data file can be transferred from the first client to the second client. If the data-file identifier does not match the reliable identifier within the data base, no authentication certificate is issued, and the first data-file identifier is systematically compared against a remaining plurality of identifiers within the main data base of the central index server to determine its true identity.

31 Claims, 9 Drawing Sheets

U.S. PATENT DOCUMENTS

| | | | | |
|---|---|---|---|---|
| 4,616,263 A | 10/1986 | Eichelberger | | 358/185 |
| 4,648,123 A | 3/1987 | Schrock | | 455/67 |
| 4,745,559 A | 5/1988 | Willis et al. | | 364/514 |
| 4,766,581 A | 8/1988 | Korn et al. | | 369/30 |
| 4,769,833 A | 9/1988 | Farleigh et al. | | 379/105 |
| 4,844,679 A | 7/1989 | Teranishi | | 414/331 |
| 4,867,628 A | 9/1989 | Ammon et al. | | 414/273 |
| 4,891,720 A | 1/1990 | Grant et al. | | 360/92 |
| 4,893,307 A | 1/1990 | McKay et al. | | 370/94.1 |
| 4,961,139 A | 10/1990 | Hong et al. | | 364/200 |
| 5,014,125 A | 5/1991 | Pocock et al. | | 358/86 |
| 5,093,718 A | 3/1992 | Hoarty et al. | | 358/84 |
| 5,101,488 A | 3/1992 | Rosenthal et al. | | 395/425 |
| 5,132,789 A | 7/1992 | Ammon et al. | | 358/86 |
| 5,133,065 A | 7/1992 | Cheffetz et al. | | 395/575 |
| 5,133,079 A | 7/1992 | Ballantyne et al. | | 455/4.1 |
| 5,192,999 A | 3/1993 | Graczyk et al. | | 358/85 |
| 5,220,420 A | 6/1993 | Hoarty et al. | | 358/86 |
| 5,224,205 A | 6/1993 | Dinkin et al. | | 395/200 |
| 5,233,346 A | 8/1993 | Minerd et al. | | 340/825.52 |
| 5,357,276 A | 10/1994 | Banker et al. | | 348/7 |
| 5,392,400 A | 2/1995 | Berkowitz et al. | | 395/200 |
| 5,410,343 A | 4/1995 | Coddington et al. | | 348/7 |
| 5,497,502 A | 3/1996 | Castille | | 455/5.1 |
| 5,528,281 A | 6/1996 | Grady et al. | | 348/7 |
| 5,544,352 A | 8/1996 | Egger | | 395/600 |
| 5,570,126 A | 10/1996 | Blahut et al. | | 348/7 |
| 5,608,447 A | 3/1997 | Farry et al. | | 348/7 |
| 5,617,539 A | 4/1997 | Ludwig et al. | | 395/200.02 |
| 5,625,404 A | 4/1997 | Grady et al. | | 348/7 |
| 5,635,979 A | 6/1997 | Kostreski et al. | | 348/13 |
| 5,675,819 A | 10/1997 | Schuetze | | 395/760 |
| 5,701,469 A | 12/1997 | Brandli et al. | | 395/613 |
| 5,712,906 A | 1/1998 | Gradys et al. | | 379/93.17 |
| 5,715,395 A | 2/1998 | Brabson et al. | | 395/200.13 |
| 5,734,961 A | 3/1998 | Castille | | 455/5.1 |
| 5,737,532 A | 4/1998 | DeLair et al. | | 395/200.49 |
| 5,754,784 A | 5/1998 | Garland et al. | | 395/200.49 |
| 5,754,938 A | 5/1998 | Herz et al. | | 455/4.2 |
| 5,764,982 A | 6/1998 | Madduri | | 395/680 |
| 5,778,185 A | 7/1998 | Gregerson et al. | | 395/200.56 |
| 5,778,363 A | 7/1998 | Light | | 707/5 |
| 5,778,368 A | 7/1998 | Hogan et al. | | 707/10 |
| 5,784,562 A | 7/1998 | Diener | | 395/200.47 |
| 5,794,178 A | 8/1998 | Caid et al. | | 704/9 |
| 5,794,249 A | 8/1998 | Orsolini et al. | | 707/104 |
| 5,796,393 A | 8/1998 | MacNaughton et al. | | 345/329 |
| 5,806,065 A | 9/1998 | Lomet | | 707/8 |
| 5,845,070 A | 12/1998 | Ikudome | | 395/187.01 |
| 5,848,410 A | 12/1998 | Walls et al. | | 707/4 |
| 5,857,179 A | 1/1999 | Vaithyanathan et al. | | 707/2 |
| 5,870,744 A | 2/1999 | Sprague | | 707/9 |
| 5,877,755 A | 3/1999 | Hellhake | | 345/327 |
| 5,878,410 A | 3/1999 | Zbikowski et al. | | 707/2 |
| 5,884,035 A | 3/1999 | Butman et al. | | 395/200.48 |
| 5,884,305 A | 3/1999 | Kleinberg et al. | | 707/6 |
| 5,903,892 A | 5/1999 | Hoffert et al. | | 707/10 |
| 5,920,854 A | 7/1999 | Kirsch et al. | | 707/3 |
| 5,920,859 A | 7/1999 | Li | | 707/5 |
| 5,926,811 A | 7/1999 | Miller et al. | | 707/5 |
| 5,931,907 A | 8/1999 | Davies et al. | | 709/218 |
| 5,956,711 A | 9/1999 | Sullivan et al. | | 707/6 |
| 5,960,194 A | 9/1999 | Choy et al. | | 395/613 |
| 5,960,404 A | 9/1999 | Chaar et al. | | 705/8 |
| 5,963,957 A | 10/1999 | Hoffberg | | 707/104 |
| 5,966,139 A | 10/1999 | Anupam et al. | | 345/440 |
| 5,966,703 A | 10/1999 | Burrows | | 707/2 |
| 5,970,464 A | 10/1999 | Apte et al. | | 705/4 |
| 5,974,409 A | 10/1999 | Sanu et al. | | 707/3 |
| 5,974,412 A | 10/1999 | Hazlehurst et al. | | 707/3 |
| 5,983,218 A | 11/1999 | Syeda-Mahmood | | 707/3 |
| 5,987,376 A | 11/1999 | Olson et al. | | 701/201 |
| 5,987,454 A | 11/1999 | Hobbs | | 707/4 |
| 5,987,464 A | 11/1999 | Schneider | | 707/10 |
| 6,003,041 A | 12/1999 | Wugofski | | 707/104 |
| 6,005,860 A | 12/1999 | Anderson et al. | | 370/352 |
| 6,006,221 A | 12/1999 | Liddy et al. | | 707/5 |
| 6,006,223 A | 12/1999 | Agrawal et al. | | 707/5 |
| 6,006,225 A | 12/1999 | Bowman et al. | | 707/5 |
| 6,012,096 A | 1/2000 | Link et al. | | 709/233 |
| 6,026,409 A | 2/2000 | Blumenthal | | 707/104 |
| 6,029,195 A | 2/2000 | Herz | | 709/219 |
| 6,032,129 A | 2/2000 | Greef et al. | | 705/27 |
| 6,038,560 A | 3/2000 | Wical | | 707/5 |
| 6,044,374 A | 3/2000 | Nesamoney et al. | | 707/10 |
| 6,044,376 A | 3/2000 | Kurtzman, II | | 707/102 |
| 6,052,784 A | 4/2000 | Day | | 713/201 |
| 6,055,513 A | 4/2000 | Katz et al. | | 705/26 |
| 6,055,568 A | 4/2000 | Adams | | 709/221 |
| 6,064,980 A | 5/2000 | Jacobi et al. | | 705/26 |
| 6,070,158 A | 5/2000 | Kirsch et al. | | 707/3 |
| 6,076,108 A | 6/2000 | Courts et al. | | 709/227 |
| 6,078,892 A | 6/2000 | Anderson et al. | | 705/10 |
| 6,078,913 A | 6/2000 | Aoki et al. | | 707/2 |
| 6,085,223 A | 7/2000 | Carino, Jr. et al. | | 709/203 |
| 6,092,074 A | 7/2000 | Rodkin et al. | | 707/102 |
| 6,094,676 A | 7/2000 | Gray et al. | | 709/217 |
| RE36,840 E | 8/2000 | Mihalisin et al. | | 345/140 |
| 6,128,599 A | 10/2000 | Walker et al. | | 705/14 |
| 6,128,647 A | 10/2000 | Haury | | 709/207 |
| 6,144,944 A | 11/2000 | Kurtzman, II et al. | | 705/14 |
| 6,154,739 A | 11/2000 | Wrobel | | 707/6 |
| 6,169,989 B1 | 1/2001 | Eichstaedt et al. | | 707/100 |
| 6,175,829 B1 | 1/2001 | Li et al. | | 707/3 |
| 6,182,050 B1 | 1/2001 | Ballard | | 705/14 |
| 6,189,008 B1 | 2/2001 | Easty et al. | | 707/10 |
| 6,192,131 B1 * | 2/2001 | Geer et al. | | 380/283 |
| 6,192,372 B1 | 2/2001 | Yamaura et al. | | 707/104 |
| 6,212,494 B1 | 4/2001 | Boguraev | | 704/9 |
| 6,212,527 B1 | 4/2001 | Gustman | | 707/102 |
| 6,233,575 B1 | 5/2001 | Agrawal et al. | | 707/6 |
| 6,308,172 B1 | 10/2001 | Agrawal et al. | | 707/5 |
| 6,675,205 B2 * | 1/2004 | Meadway et al. | | 709/219 |
| 7,209,889 B1 * | 4/2007 | Whitfield | | 705/14 |
| 2001/0051996 A1 * | 12/2001 | Cooper et al. | | 709/217 |
| 2002/0033844 A1 * | 3/2002 | Levy et al. | | 345/744 |
| 2002/0052885 A1 * | 5/2002 | Levy | | 707/200 |
| 2002/0133499 A1 * | 9/2002 | Ward et al. | | 707/102 |
| 2002/0138744 A1 * | 9/2002 | Schleicher et al. | | 713/187 |
| 2004/0128514 A1 * | 7/2004 | Rhoads | | 713/176 |

OTHER PUBLICATIONS

"Gnutella News—Gnutella News and Informtaion," Aug. 10, 2000, www.gnutella.com.

"Gnotella Help Page," Aug. 10, 2000, www.gnotella.nerdherd.net/help.html.

SourceForge, "The Free Network Project Hom," Aug. 10, 2000, www.freenet.sourceforge.net/.

Bob Schmidt, "nguCache—Connecting the world," Aug. 10, 2000, www.gnucache.backroomwarehouse.com/.

* cited by examiner

600

| 601 | Uniquely Assigned Song I.D. | 1,264,325 |
|---|---|---|
| 603 | Sign Title | "Let It Be" (Studio Recording) |
| 605 | Reference Finger Print | E362 |
| 607 | MD5 | F01G, BB90 |
| 609 | Composer(s) | John Lennon |
| 611 | Album(s) | Best of the Beatles<br>Greatest Hits of the 60's |
| 613 | Performing Artist(s)/Band | The Beatles, John Lennon,<br>Paul McCartney,<br>George Harrison, Ringo Starr |
| 615 | Authentification Certificate | 7CC1 |
| 617 | Status | Copy Restricted |
| 618 | Restriction Code | |
| 620 | I.P. Address of Clients containing this Song | |
| 619 | Uniquely Assigned Song I.D. | 1,264,326 |
| 621 | Song Title | "Let It Be" (Live Concert Recording) |
| 623 | Reference Fingerprint | E749 |
| 625 | MD 5 Identifier | 6A40, 6A51, 7028 | o
o
o
o

*Fig. 6*

METHOD AND APPARATUS FOR CONTROLLING FILE SHARING OF MULTIMEDIA FILES OVER A FLUID, DE-CENTRALIZED NETWORK

The present application claims priority as a continuation-in-part to U.S. application Ser. No. 09/560,106, entitled "Use Sensitive Distribution of Data Files Between Users" to Fanning et al., filed on Apr. 28, 2000 now U.S. Pat. No. 6,742,023 and incorporated herein by reference and U.S. patent application Ser. No. 10/025,443, entitled "Real Time Search Engine" to Fanning et al., filed on Dec. 19, 2001 now U.S. Pat. No. 7,165,071 and incorporated herein by reference, which claims priority as a continuation Ser. No. 09/464,653 to U.S. Pat. No. 6,366,907, entitled "Real Time Search Engine" to Fanning et al., filed on Dec. 15, 1999, issued on Apr. 2, 2002 and incorporated herein by reference.

FIELD OF THE INVENTION

The present invention relates to the sharing of files by clients through a central server-index capable of controllably linking client requesters with client providers. More specifically, the present invention relates to linking authentication certificates to data files that are authorized for public transfer and exchange.

BACKGROUND OF THE INVENTION

The most obvious benefit of the digital revolution in the field of multimedia recording has been the clarity and quality of a digital recording, and its resistance to corruption when compared to analog sound recordings. As Internet speed and flexibility advance, digital exchanges of multimedia files such as sound recordings have become common. In the earliest stages of Internet file transfer, large files would typically consume valuable bandwidth, and were time consuming for both the transmitting party and the receiving party. Today, owning to a variety of factors including data compression techniques, digital files, including multimedia files can be transferred over the Internet in formats consuming far less bandwidth. As compression reduces the size of multimedia files, the speed of transmission and processing increases every year. Both these factors contribute to faster and more efficient file exchange over the Internet. At the same time, file storage by end users has also become increasingly practical. Compressed files also consume less space on a hard drive. Additionally, hard drive storage capacity has increased at a staggering rate. As a result, disk drives which were once reserved for storage of essential data, such as a word processing application essential to a business operation, have increasingly supported storage of recreational data, from games to multimedia data files such as MP3 audio and MPEG-2 video. The confluence of these advances has created a widening market of file sharing across the Internet. In a typical Internet file transfer, files are first compressed and then transmitted over the Internet. Some files are decompressed when re-stored at their new location. As microprocessors speeds have increased, however, it is often possible to decompress a file while it is actually running. This is particularly true for audio MP3 files, and will probably become more true for MPEG video files as processing speeds continue to increase. Originally, file sharing over the Internet was largely "point to point," such as occurs when a first person sending a file to a second person and "centralized file sharing" such as downloading new virus patterns or a new driver from a central location, such as a merchant web site. Recently, however, de-centralized file exchanges have become popular through the application of central index servers. In a de-centralized network, clients log on to a central index server, and files available for sharing within each of the clients are logged into the central index server, along with an IP address or other identity of the client computer containing the files available for sharing. The clients are then able to share or swap any files among themselves that are listed in the index server, thereby directing each client to another client or clients where a particular file may be located. Clients are thus able to share files with other clients when they might otherwise have never known of the existence of such an available file.

To maintain a "fluid" or substantially real time network, when a client initially logs onto the index server, the index server searches certain file locations within the memory of the client and generates a log relating specific data or program files found at that location. This log is indexed against the internet protocol (IP) addresses of that respective client. Similarly, when a client logs off, a disconnect signal initiated by the client, or a periodic "ping" initiated by the server to determine if the client is still on-line, allows the central index server to update the index and purge file identifications referenced to a client that is no longer on line. In this manner, the central index server is capable of maintaining a substantially real-time index of clients on line, and a corollary real time index of the data files respectively stored in the clients that are on line at any given time. Because the central index server is able to maintain a substantially real time index in a decentralized network wherein clients are expected to be continually logging on and off, the network is said to be "fluid." The continual logging on and logging off by clients does not substantially degrade the reliability of the data indexed within the main data base of the central index server in a fluid network.

If more than one on-line client has the same data or program file, that data or program file is logged multiple time in association with the multiple client possessors. A requestor client seeking that particular file can then be directed to any other clients who are shown in the index server to possess the requested file. The index server also facilitates connection between a requester and a provider when a client requesting a particular file is matched to a particular provider in possession of the requested file. In this way, each client can be both a requester and a provider while logged onto the index server. The network is "distributed" or "de-centralized" in that the files are not located in the central server . . . only an index identifying the available files and their various IP addresses is stored within the central index server. The files themselves are located at diverse locations in client computers distributed across the network. Background for methods and apparatus for file swapping over a fluid, de-centralized network through a central index server is found in U.S. patent application Ser. No. 09/464,653, Real Time Search Engine to Fanning et al., filed Dec. 15, 1999, and U.S. patent application Ser. No. 09/560,106, Use Sensitive Distribution of Data Files Between Users to Fanning et al., filed Apr. 28, 2000.

FIG. 1 is a simplified depiction of a decentralized network configured for file sharing through a central index server. Client A and Client B have both logged onto the central index server 101 through the server interface 107. Within the central index server 101 is a main data base 102. Client A 103 possesses The Beatles "A Hard Day's Night," "Help," and "Yesterday" within its memory, and is seeking a copy of Max Bruch's Violin Concerto #1. Client B 105 has also logged onto the index server. Client B 105 currently has Gustav Holtz "The Planets," Brahms' "Academic Festival" and the Bruch Violin Concerto #1 stored in memory, and is seeking a copy of Gershwin's "Rhapsody in Blue." Because the index server 101 has surveyed each client 103, 105 as those clients logged on, the server 101 has indexed within its main data base 102 a log of all data files stored in the various client computers 103, 105 which are presently on line. Unlike the clients computers 103, 105, however, which possess an entire data file, the indexed entries 110, 112, 114, 116 within the index server 101 only contains an identifier of the file, such as the song title, which is indexed against the IP address of the client possessing the actual file. According to the example depicted in FIG. 1, the index server will provide Client A 103 an address of at least one client currently on line who possess a file of Max Bruch's Violin Concerto #1 in memory. Typically the index server will provide a list of multiple clients from whom the desired file might be obtained, and the client seeking the data file will examine a variety of data to determine from which of the potential sources the desired file might be obtained most efficiently and reliably. When the requesting client decides upon a specific provider client, communication is established between the two clients, and the file is transferred.

FIG. 2 illustrates representative data fields which may be stored within each client computer in conjunction with a sound recording. The fields typically include song title 201, composer 202, lyricist 203, performing artist 204, group or band 205, album title 206, MD5 identifier 207 bit rate 208 and frequency 209. The function of an MD5 identifier 207, bit rate 208 and frequency 209 will be discussed below. The two brackets 211, 213 differentiate groups of this data which are used for different purposes. The first bracket 211 represents a song certificate, and comprises data identifying the sound recording stored in the client computer. When the client computer 103 logs onto the central index server 101 and the central index server indexes a sound recording against the IP address of a client computer 103, the index within the central index server typically comprise the song certificate data 211 of FIG. 2, potentially excluding some of the fields listed, or including similar fields not shown.

The second bracket 213 represents a file certificate. A file certificate 213 includes data essential to re-play the sound recording stored in the data file. As discussed explained herein, the de-compression of an MP3 file requires data about how the recording was "ripped" including bit rate 208 and frequency rate 209. Since the entire sound recording file is not stored in the central server index 101, is not played by or within the central server index 101, and is, upon facilitation by the central server index, transferred directly from a first client computer 103 to a second client computer 105, the file certificate data, much of the data within the file certificate 213 is not typically stored within the data base of the central index server 101.

The explosive growth and popularity of de-centralized file swapping of multimedia data files such as sound recordings through the intermediary assistance of index servers has created a derivative concern with respect to the possible violation of copyright protected works which could theoretically be exchanged through such a process. Because the central server does not contain data files, but only indexes the data files stored in the client memories currently logged on, protected works within the memory of one client could theoretically be requested by a requesting client, and transferred from a provider client. Without copyright safeguards, the central index server 101 will blithely connect the requester client 103 to the provider client 105, unwittingly facilitating a copyright infringement between the two client computers 103, 105.

Early efforts to restrict file sharing or swapping of restricted files were limited to flagging the names of copy-restricted files within the memory of the index server. If a request for a copy-restricted file were entered, the central index would refuse to facilitate a connection between a requestor client and a provider client. Such a security system, however, proved easy for increasingly sophisticated consumers to hack or circumvent. File copying and sharing restrictions could be evaded by simply re-naming a file. For exemplary purposes only, assume that the Beatles' songs "Help" and "Yesterday" are copy restricted. By publicized announcement among network hackers, potential users would be notified that everyone was to re-name and/or request data files according to a common algorithm, such as appending an "X" as the last letter of all song titles such that "Help" is renamed "Helpx" and "Yesterday" as "Yesterdayx." Through such machinations, users could thwart basic copyright protection programs within the central index server. A security system configured to prohibit file sharing of specific titles such as "Help" and "Yesterday" might not be programmed or equipped to prevent the exchange of files entitled "Helpx" or "Yesterdayx.".

There exists therefore a need for a method and apparatus for controlling file distribution of multimedia files over a de-centralized network which is coordinated through an intermediary central index server. There further exists a need for identifying copyright protected works in a central index server in order to control the distribution of copyright protected material over a de-centralized network. There is also a need for a tamper resistant method and apparatus for restricting network sharing of copy restricted files, thereby frustrating attempts by hackers to breach security measures within a central index server designed to prevent the sharing of copyrighted material. There is a further need for a hacker-resistant system that can be implemented efficiently, thereby minimizing delays associated with the implementation of tamper resistant security measures. There is further a need for a security system for preventing file sharing of copy restricted information that does not incur an unreasonable delay in the file identification process during a single file sharing session of limited duration.

SUMMARY OF THE INVENTION

The present invention is a method and apparatus for controlling file distribution of files over a de-centralized network which is coordinated through an intermediary central index server. The invention is preferably directed toward distribution of any type of file, though it is particularly useful for peer-to-peer distribution of multimedia files. The present invention further provides a method and apparatus for identifying copyright protected works in a central index server in order to control the distribution of copyright protected material over a de-centralized network. The present invention is also a tamper resistant method and apparatus for restricting network sharing of copy restricted files, thereby frustrating attempts by hackers to breach security measures within a central index server designed to prevent the sharing of copyrighted material. The present invention is also a hacker-resistant control method and apparatus for controlling de-centralized file-sharing which can be implemented efficiently, thereby minimizing delays associated with the implementation of tamper resistant security measures. The present invention is also a security system for preventing file sharing of copy restricted information which does not incur an unreasonable delay in the file identification process during a single file sharing session of limited duration.

A fluid, de-centralized network comprises a first client, a second client and a central index server with a memory having a main data base. The central index server is configured to facilitate a connection between the first client and the second client to control file exchanges of multimedia data files. A plurality of reliable identifiers are generated from a respective plurality of known multimedia data files. A determination is made as to whether there are copy restrictions respectively associated with the plurality of known multimedia data files. The presence or absence of copy restrictions comprises a status of a known multimedia data file. An index is formed within the main data base. The index comprises a plurality of unique reference IDs correlated to the plurality of known multimedia data files. Each of the plurality of reliable identifiers are indexed along with the plurality of statuses respectively associated with the plurality of unique reference IDs within the main data base of the central index server. Communication between the first client and the central index server is established. A client-file identifier is generated from a first multimedia data file present in the first client. The first multimedia data file comprises ancillary data including user recognizable data. The client-file identifier is compared to a first reliable identifier within the central index server. The first reliable identifier within the central index server is selected according to the steps of indexing sets of ancillary data corresponding to the plurality of known multimedia files, including user-recognizable data, against the respective plurality of unique reference IDs within the main data base of the central index server, and selecting a reliable identifier comprising ancillary data corresponding to the ancillary data of the first multimedia data file. If a determination is made that the client-file identifier and the first reliable identifier do not represent the same underlying performance, the process systematically compares the client-file identifier against a remaining sequence of reliable identifiers within the main database of the central index server. A first unique reference ID is presented as corresponding to the first reliable identifier. If it is determined that the client-file identifier and the first reliable identifier represent the same underlying performance the first unique reference ID is downloaded from the central index server to the first client. An authentication certificate is downloaded from the central index server to the first client following the step of determining that the client-file identifier and the first reliable identifier represent the same underlying performance. According to one embodiment, each reliable identifier is a fingerprint of its respective known multimedia file. A fingerprint is generated according to the steps of defining a set of sensible characteristics of a multimedia recording, establishing quantifiable parameters for measuring each of the sensible characteristics examining the sensible characteristics of the underlying performance, and quantifying each of the sensible characteristics of the underlying performance according to the quantifiable parameters.

According to one embodiment, each reliable identifier is a digital hash extracted from its respective multimedia file. The digital hash is generated by digitally reducing a size of the known multimedia file through a digital reduction algorithm. An IP address of the first client is indexed against the first reference ID in the main data base, a file request for a file represented by the unique reference ID is received from the second client, and a connection between the first client and the second client is facilitated. The first multimedia file is then transferred from the first client to the second client.

If a determination is made that the client-file identifier does not represent the same performance as any reliable identifier stored within the main data base of the central index server, the client-file identifier is stored in a data base of unknown files within the central index server along with ancillary data related to the file identified by the client-file identifier. The client-file identifier is compared to other identifiers within the data base of unknown files. If it is determined that some identifiers within the data base of unknown files match in that they represent the same performance, other data fields related to matching identifiers are compared; and a reliability of an identification is determined based upon the degree of agreement among the various data fields related to the matching identifiers. According to one embodiment, a data profile of the underlying performance represented by the matching identifiers is created. The data profile includes a representative identifier. The data file is indexed against an unused reference ID within the main data base of the central index server.

A method of controlling file exchanges of multimedia data files in a fluid, de-centralized network comprises the steps of establishing a communication between a first client and a central index server, searching a memory of the first client for usable data files, and identifying select files which lack authentication certificates issued by the central index server. A first data-file identifier is generated for a first multimedia data file among the select files lacking authentication certificates within the first client, and the first data-file identifier is compared to a first reliable identifier in a main data base of the central index server. The first reliable identifier is indexed within the main data base against a first unique reference ID. If a determination is made that the first data-file identifier matches the first reliable identifier, a valid authentication certificate is issued to the first data file in the client. An IP address of the first client is referenced against the first unique reference ID within the main data base of the central index server. A file request is received from the second client for a file represented by the first unique reference ID. A connection is facilitated between the first client and the second client, and the first multimedia data file is transferred from the first client to the second client.

If a determination is made that the first data-file identifier does not match the first reliable identifier, the first data-file identifier is systematically compared against a remaining plurality of identifiers within the main data base of the central index server. If a determination is made that the first data-file identifier does not represent a same performance as any reliable identifier stored within the main data base of the central index server, the first data-file identifier is stored, along with ancillary data related to the first multimedia data file, in a data base of unknown files within the central index server. A data profile of an underlying performance is created. The underlying performance is represented by the matching identifiers. The data profile includes a representative identifier. The data profile is indexed against an unused reference ID within the main data base of the central index server.

The first reliable identifier advantageously comprises a fingerprint of a respective multimedia file. The fingerprint is generated according to the steps of defining a set of sensible characteristics of a multimedia recording, establishing quantifiable parameters for measuring each of the sensible characteristics, examining the sensible characteristics of the underlying performance, and quantifying each of the sensible characteristics of the underlying performance according to the quantifiable parameters. The first reliable identifier advantageously comprises a digital hash extracted from a respective multimedia file, the digital hash being generated according to the step of digitally reducing a size of the known multimedia file through a digital reduction algorithm. The digital hash is preferably a value derived from an MP3 compression of a sound recording.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 6 illustrates a collection of data within the main data base of a central index server.

DETAILED DESCRIPTION OF THE INVENTION

Figure 1:
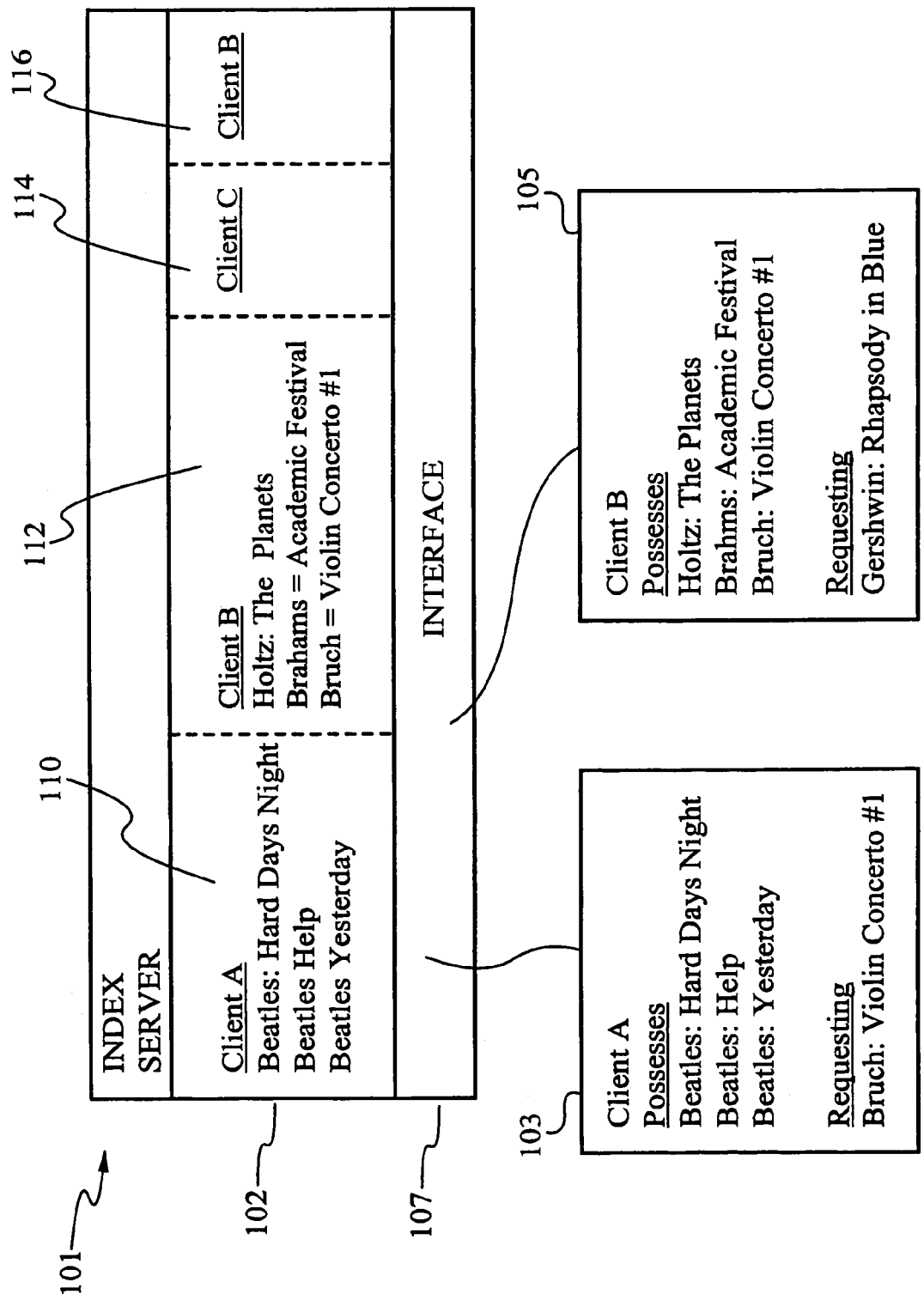
FIG. 1 illustrates two client computers accessing a central index server to participate in file sharing on a fluid, de-centralized file sharing network.
Figure 2:
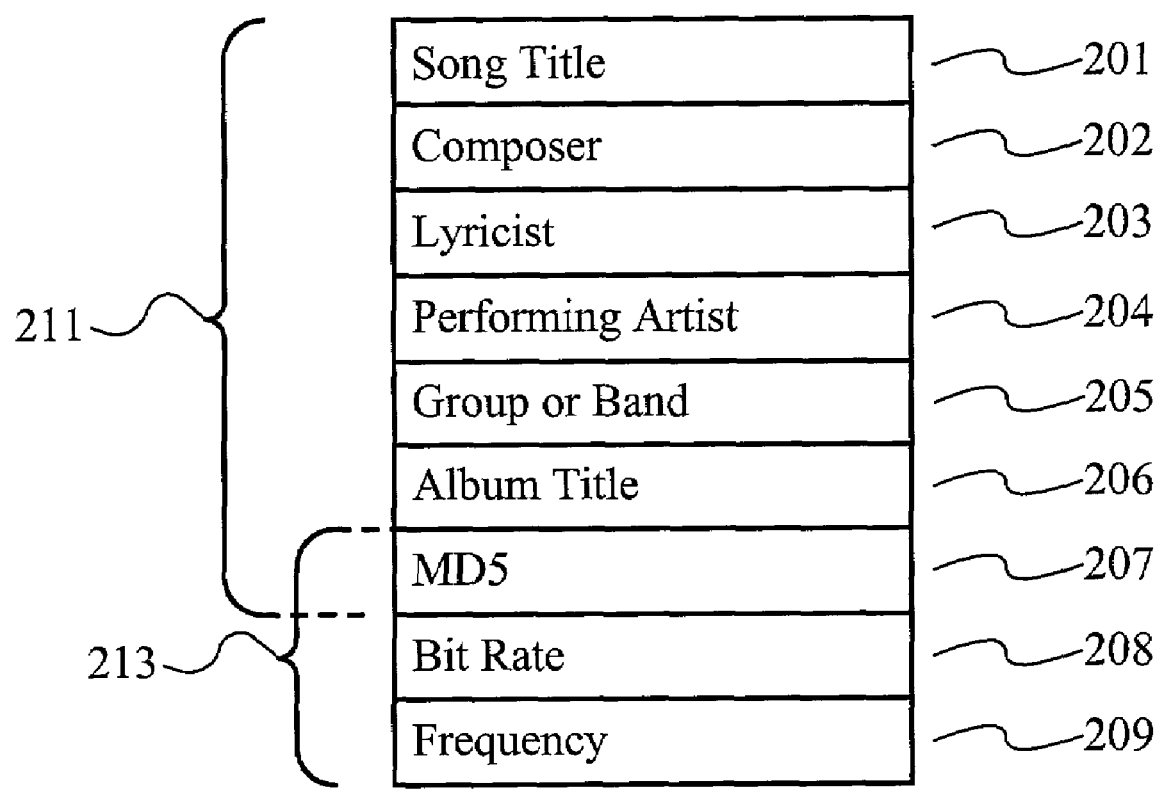
FIG. 2 illustrates a song certificate typically stored in conjunction with a digital sound recording.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. For example, although the examples contained herein are frequently described in terms of sound recordings, the present invention can be applied to any packetized data file, and particularly, any packetized multi-media data file, including video. Furthermore, in the following detailed description of the present invention, numerous specific details are set forth in order to more fully illustrate the present invention. However, it will be apparent to one of ordinary skill in the art that the present invention may be practiced without these specific details. In other instances, well-known methods and procedures, components and processes have not been described in detail so as not to unnecessarily obscure aspects of the present invention.

If a multimedia file is in the public domain, or if the copyright holder has waived their rights, the status of the multimedia file is copy permitted. Conversely, if a copyright is in force and the right holder seeks to enforce that right, a recording or data file is copy restricted. Because many artists and authors desire to have their copyright protection enforced, central index servers facilitating file exchange over a de-centralized network must identify all copyrights and copy-restrictions associated with a data file.

By its very nature, the process of reducing an analog file, such as a sound recording to digital format, will not produce identical digital representations when digitized. Although the reasons can be somewhat complex, some of the basic reasons for this phenomenon stem can be understood by considering the analog waveforms illustrated in FIG. 3. As those skilled in the art will recognize, a music recording is made up of many analog signals or sine waves 301, 303, 305 representing individual harmonics from various sources, such as different musical instruments and voices, which coalesce to form the sound of a symphony, rock band, or other music ensemble. By digitally sampling the analog sounds above the Nyquist rate of the highest frequency marked for digital recording, the waveforms can be reliably stored in digital format. According to FIG. 3, digitizer A (not shown) samples the waveforms at times $t_{1a}$, $t_{2a}$ and $t_{3a}$, and digitizer B samples the waveforms at the same sampling frequency, but begins the sampling process at a slightly different time offset, such that the samples are taken at times $t_{1b}$, $t_{2b}$ and $t_{3b}$. It can be plainly seen that the state of the waveforms are different when sampled by digitizer A than when sampled by digitizer B. Accordingly, the digital representations created will be different. However, when reversing the process, the analog waveforms reproduced from the digitized recording A will be virtually identical to the analog waveforms reproduced from the digitized waveforms B provided the sampling took place above the Nyquist rate of the highest frequency detectable to the human ear. According to this example, it can therefore be understood that radically different digital patterns may, upon decoding, yield virtually identical underlying analog files such as sound records or other multimedia representations.

Another reason that digital files deriving from the same source may nevertheless be different is the application of a "lossy" reduction algorithm. There are a variety of reasons for reducing a digital file, but the two most common objectives are to "compress" a file, which may be subsequently re-expanded, thereby reproducing the original file, and various and tags, hashes, checksums, CRCs, identifiers, etc. which are distilled from a digital file for the purposes of verifying the identification and/or accuracy of a file, but are not sufficiently detailed to re-expand into a reasonable facsimile of the original data file.

Compression has become increasingly popular for both transmission and storage purposes. When compressed, a file may be reduced in size, thereby taking up less storage space, or, under transmission, consuming less bandwidth. According to one of the more common forms of compression, patterns or bit sequences in a digital file are discovered and stored. When the bit pattern or sequence is repeated, reference is simply made to the address containing the repeated sequence. In this way, a single address can be substituted to represent a long sequence of data. The longer a data string defined by an address, and the more frequently that data string is repeated throughout the uncompressed file, the higher the level of compression. Some poorer compression ratios may only yield a ratio of one-and-a-half to one, wherein the compressed file is two thirds the size of the original data file. On the other hand, more efficient compression algorithms may yield compression ratios of five to one or better. Although there are a great many compression algorithms in existence, they can generally be divided into one of two categories, "lossy" compression algorithms, and "lossless" compression algorithms. Lossy compression algorithms are not designed to reproduce the original digital file perfectly, there is a "loss" of data. On the other hand, true lossless compression algorithms are able to reproduce the original digital data files perfectly. By their very nature, lossy compression algorithms are typically able to achieve higher compression ratios, albeit with less accuracy. In contrast, the increased accuracy of a lossless compression scheme will typically be accompanied by a lower compression ratio. The trade off is between accuracy and efficiency. The MP3 standard is a lossy compression format commonly used in conjunction with digital audio files. A variety of standards relating to the compression, storage and transmission of digital audio files audio standards, including IS 1172-2, IS 13818-3 and MPEG-1 layer 3 specification are commonly known to those skilled in the art.

As noted above, one purpose of reducing a digital file to a smaller file or field is to perform one of a variety of confirmations, identifications or verifications of the original digital file. A well known example of this is the cyclical redundancy check (CRC) which verifies to a high probability that a file has been received error free. A similar process has come to be used frequently in conjunction with digital multimedia data files. One such reduction algorithm used in conjunction with MP3 sound recordings is an MD5 file. An MD5 file is a digital identifier typically generated by a reduction algorithm applied to an already compressed digital MP3 file. Because multiple rips may be made from the same digital file, however, the purpose of an MD5 file is not typically one of error checking, but to confirm that two MP3 files are identical copies rather than separate rips of the same sound recording. Accordingly, an MD5 file is typically used to confirm the authenticity of an MP3 file as a duplicate copy of another MP3 file. Unlike compression techniques, which can be completely reversed if lossless, or substantially reversed if lossy, an MD5 file cannot be "uncompressed" or re-expanded in any way. It simply serves as an identification or tag for an MP3 file. In part, this is because identification files like an MD5 or a CRC are much shorter than compression files. There simply isn't enough information. They are used for error checking and verification of a file identify. They are not adequate for file re-construction.

Figure 3:
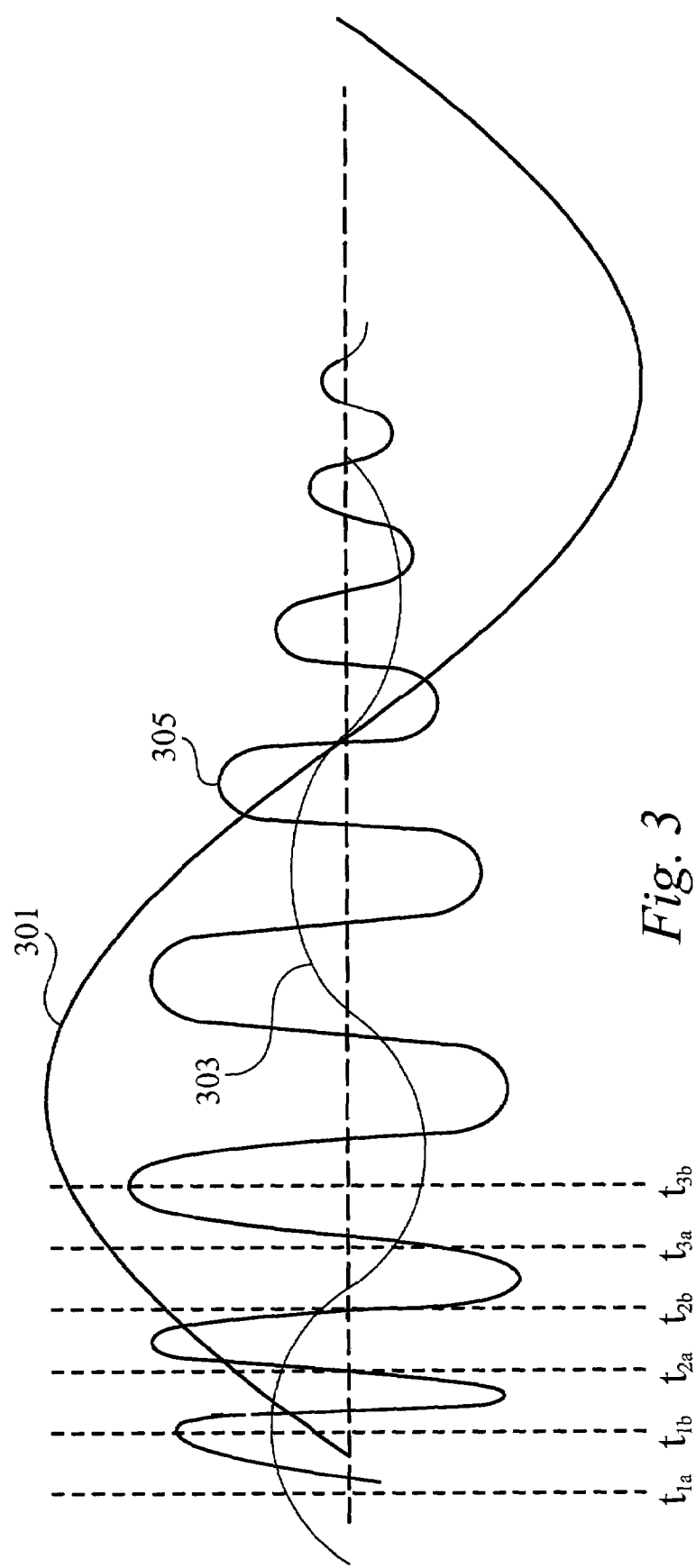
FIG. 3 illustrates time sampling of multiplexed analog signals.

As discussed in conjunction with FIG. 3, separate digitizers recording and digitizing the same analog sound patterns 301, 303, 305 will create distinct digital data files. Added to this, MP3 is a "lossy" reduction algorithm of digital sound recording. Among other variations, each user creating an MP3 file selects certain "encoder settings" such as sampling rate or frequency. A ripper operating at 64 kilo-bytes per second will produce a different MP3 file than a ripper operating at 256 kilo-bytes per second. Moreover, different rippers even use different compression algorithms, which incur greater or less loss of information. The greater the difference in the ripper settings, the greater the difference in the digital patterns of the respective MP3 files. Even if separate MP3 files are individually generated from the same ripper settings, it is unlikely that the files would ever be identical. Only when a second MP3 file is produced by copying a first MP3 file will the two files be identical. Because the two MP3 files will be distinct when ripped separately, the MD5 "identifiers" generated from the distinct MP3 files will also be distinct. Because of this, if a first MD5 identifier matches a second MD5 identifier, there is a high degree of certainty that the two MP3 files were copies of each other, and therefore must represent the same sound recording. The converse, however, is not true. If two MD5 identifiers are distinct, it is clear that they were generated from separate MP3 files. However, just because two MP3 files are distinct does not mean the underlying sound recording was different. The distinct MP3 files may simply be separate "rips" of the same digital recording. Because of this, an analysis of two separate MD5 values can determine a high probability that they are generated from the same MP3 file if the MD5 values are identical. However, it cannot be said with any certainty that distinct MD5 identifiers are from different sound recordings.

Like an MD5 file, a "fingerprint" is used for identification, not for reconstruction of a sound recording. A "fingerprint" is a digital value, or cluster of digital values describing sensible (analog) characteristics and features of a sound recording (or live sound), including such characteristics as tambour, meter, rhythm, pitch, key, mood and richness. Although fingerprints describe "sensible" or analog characteristics of a sound recording, however, they may be generated directly from a digital sound recording, including a compressed digital file such as an MP3 file commonly used in conjunction with sound recordings. In essence, a fingerprint extraction program "un-compresses" an MP3 file for analysis, examines and analyzes the analog features of the digital re-construction, generates a fingerprint of those sensible characteristics, and stores the fingerprint for future identification. In contrast, generation of the MD5 file does not require a "re-construction" of the analog musical pattern since it is a raw manipulation of data. Because the fingerprint is derived from sensible or analog characteristics of a sound recording, it can therefore be understood that fingerprint identifications are not as sensitive the variations of separate MP3 rips of the same digital recording. High quality rips will contain the same song with virtually all the complexity detectable to the human ear. In contrast, different MP3 rips of the same song will produce notably different MD5 identifiers. It will be remembered, however, that two MD5 identifiers will be identical when generated from the same MP3 rip of the same digitized recording of the same analog sound recording.

Figure 4:
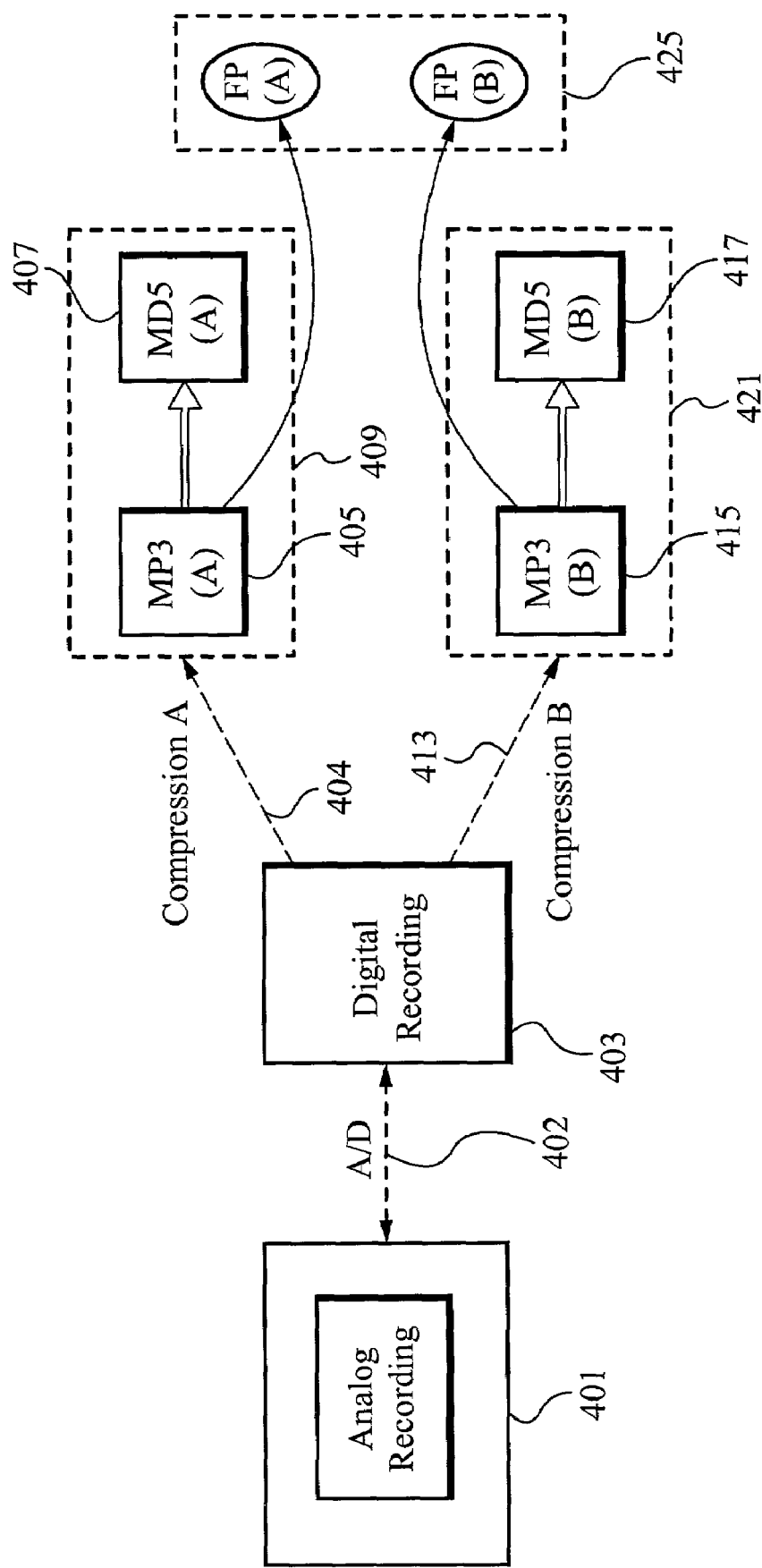
FIG. 4 illustrates the relationships and commutative limits of various analog and digital derivations of the same underlying event.

FIG. 4 illustrates a sequence of data manipulation and file reduction. An analog sound recording 401 is converted to a digital recording 403. The digital recording 403 is compressed into a first MP3 file 405. An MD5 identifier 407 is generated from the first MP3 file 405. According to the illustration, the lines representing the analog to digital conversion process 402 and the compression process 404 are dotted, indicating that the same process may yield slightly different files each time the process is repeated. As noted above, the differences between MP3 files actually depends largely on the "ripper settings." Because a user may control various settings of an MP3 ripper which in turn effect the sound quality, rips taken at the same settings will typically be similar, though not identical, and MP3 rips taken at different ripper-settings diverge more greatly in their digital pattern. Arrows pointing in both directions indicate that the process is reversible . . . that a digital recording 403 can be extracted from a compressed MP3 file 30, and an analog recording 401 or analog broadcast can be extracted from a digital recording 403. Conversely, the solid double line between the MP3 file 405 and the MD5 file 407 indicates that the algorithm generating the MD5 file will produce the exact same MD5 file every time the process is repeated. The single arrow, however, indicates that the process is not reversible. The MP3 file 405 cannot be extracted from the MD5 identifier. A fingerprint 411 is also extracted from the MP3 file 405. As noted, however, it is not a reduction algorithm of the digital pattern in the MP3 405 file. Rather, as discussed above, it is a matrix or family of values profiling certain analog characteristics of the sound recording which were extracted from the MP3 file to generate a finger print. As with the MD5 file 407, the arrow pointing to the finger print FP-A 411 is a single headed arrow, indicating that the fingerprint may not be re-constituted back into the parent MP3 405 compression.

A second "rip" 413 is seen to result in a second MP3 compressed file 415. MP3-B 415 is subsequently used to generate a second MD5 file 417 and second finger print 419. Identifier MD5-A is illustrated as isolated within a field 409 wherein it is related exclusively to its parent file MP3-A, and identifier MD5-B is similarly illustrated as isolated within a field 421 wherein it is related exclusively to its parent file MP3B. The isolated fields indicate that there is no similarity between files MD5-B and MD5-A. Because an MD5 file is generated with a view toward the specific bit patterns of the parent MP3 file, the slightest alteration, including generating MD5 files from separate "rips" of the same digital recording, will be so utterly distinct that it is virtually impossible to ascertain that they ultimately represent the same underlying analog sound recording simply by comparing the MD5 files. In contradistinction, two fingerprints, even if generated from the same MP3 file, will probably never be identical. However, fingerprints representing the same underlying analog sound recording will always be similar enough to identify them as related to the same underlying sound recording, whether from the same MP3 file, separate MP3 files ripped on separate occasions, or even from separate digital recordings of the exact same analog sound recording. This is illustrated in FIG. 4 wherein the fingerprints FP-A and FP-B are outside of the isolation fields 409, 421 of their source MP3 files, and are seen to be in a related field 425, illustrating that separate fingerprints from separate MP3 files will nevertheless be similar if ultimately deriving from the same digital recording 403.

Because any slight deviation in the underlying file, such as different rips of a digital file creating different MP3 files will generate distinct MD5 identifiers, it can readily be understood that a January $10^{th}$ and a January $15^{th}$ recording of Beethoven's Fifth Symphony by the Chicago Symphony Orchestra would generate distinct MD5 identifiers. Because they are not even the same underlying analog recording, it is impossible for them to be extracted from the same rip of the same digital recording of the same analog sound recording. MD5 files are typically sixteen bytes in length. In contrast, a fingerprint is approximately fifteen hundred bytes long. Because the fingerprint is roughly an hundred times the length of an MD5 identifier, a fingerprint takes longer to calculate, uses up more room in digital storage. However, it is ultimately more exacting in distinguishing sound recordings than the MD5 file. Conversely, the MD5 identifier is more quickly calculated and more easily stored, but lacks the certainty afforded by fingerprint technology.

Figure 5:
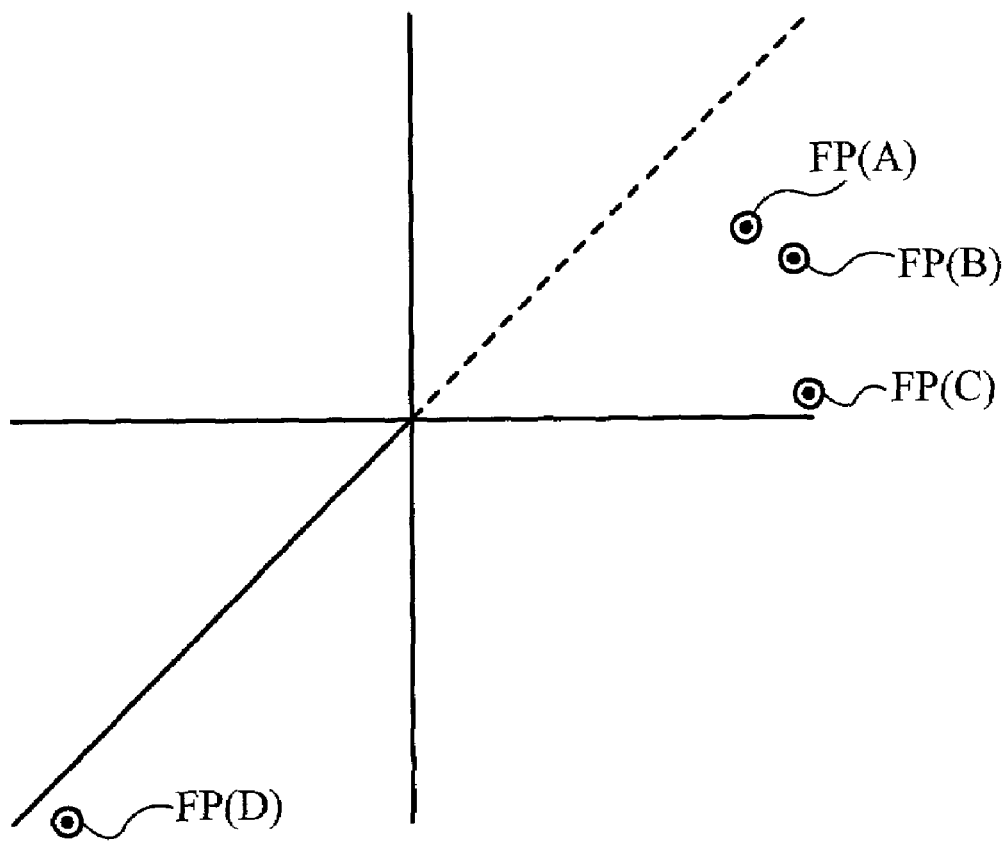
FIG. 5 is a graphical illustration of the grouping of related and unrelated fingerprints.

FIG. 5 illustrates the similarity, or lack thereof, in fingerprints from various sound recordings. Because the "sensible" aspects of the separate symphonies would be virtually indistinguishable to the average listener, the question naturally arises whether separate performances of the same underlying piece of music would be indistinguishable by fingerprint technology as well. According to the aggregate experience and testing of fingerprint technology, it has been generally observed that separate recordings of the same musical piece will be distinguishable by fingerprint technology, notwithstanding the similarity to the human ear. This is illustrated in FIG. 5. The similarity of various fingerprints are conceptually illustrated by their proximity to each other in a three-dimensional backdrop. FIG. 5 is a visual illustration of the fingerprints FP-A and FP-B taken from the separate rips MP3-A, MP3-B of the same sound recording. Because the analog or sensible qualities are unchanged in the different "rips" of the MP3 file, the fingerprints are seen to have substantially the same defining qualities in FIG. 5. FP-A and FP-B illustrates the similarity of two fingerprints drawn from the same sound recording—Beethoven's Fifth Symphony recorded on January $10^{th}$. They are very similar, as conceptually illustrated by their proximity to each other on the illustrative three-dimensional grid. Fingerprint FP-C represents a fingerprint taken from a separate sound recording of Beethoven's Fifth Symphony recorded January $15^{th}$ Although FP-C is more similar to fingerprints of the earlier recordings of Beethoven's Fifth Symphony, FP-A and FP-B than it is to a finger print FP-D of the Rolling Stone's "I Can't Get No Satisfaction," the January $15^{th}$ fingerprint FP-C nevertheless deviates from the two fingerprints FP-A and FP-B of the January $10^{th}$ recordings more than FP-A and FP-B distinguish from each other. Accordingly, separate performances of a musical piece or other sound recording are typically distinguishable under fingerprint technology.

FIG. 6 illustrates an exemplary data table 600 within the memory of the central index server 101 according to the present invention. The database within the central index server includes memory space allocated for data types related to a particular multimedia file such as a sound recording. Because it is possible for same song title, for example "Let It Be," to be recorded from multiple performances, 603, 621, reference by song title is not adequate to represent and distinguish all the different sound recordings which may be exchanged over a fluid, de-centralized file exchange network. Identification of each separate sound recording by a reference fingerprint 605, 623 has its own problems. Although separate MP3 compressions of the same sound recording will typically have fingerprints that are sufficiently similar as to be identifiable as the same song, the fingerprints will nevertheless typically be distinct. A statistical analysis of separate fingerprints must be performed to determine if they are from the same sound recording. If a reference fingerprint were used as the fundamental category around which related data were organized, every search for a particular sound recording by one signing onto the file sharing network would be extremely time intensive, requiring a statistical analysis for every song or fingerprint in the database to compare it to the requested sound recording. The system would be largely unworkable, even with the fastest computers. According to the present invention, therefore, each uniquely recorded sound recorded is assigned a unique song ID 601, 619. Preferably, the unique song ID 601, 619 is assigned by the central index server 101, or by a trusted source discussed in conjunction with FIG. 7. Data relating to a sound recording is therefore organized around the song ID 601, 619 and a search for a particular sound recording is preferably conducted against a unique song ID 601, 619 when possible, whereas an initial verification of an unverified file or determination of the identity of a new data file is most advantageously performed by comparison of the new data file's fingerprint against the trusted reference fingerprint 605, 623 stored within the central index server database.

In addition to the unique song ID 601, 619 and song title 603, 621, data fields associated with each different sound recording advantageously includes a single reference fingerprint 605, 623, one or more MD5 identifiers 607, 625, various user recognizable data in addition to the song title, including composers(s) 609, album title(s) 611, and performing artist(s), bands or musical groups 613. These user-recognizable elements are exemplary, and are not intended to limit the types of identification data that may be catalogued within the data-base of the central index server 101. It is understood that any number of additional categories, such as lyricist, arranger, recording date and even producer could be included. It is also noted that the values representing the fingerprint 602, MD5 file, and authentication certificate 615 (discussed below) are represented within FIG. 6 as hex values. The hex values are also for exemplary purposes only, and are not intended to represent that these fields are limited to sixteen bit fields, nor that the data contained in those fields is normally represented or interpreted in hex code. It is further noted that only one reference fingerprint 605, 623 is assigned to each unique song ID 601, 619, whereas multiple MD5 identifiers 607, 625 may be associated with a single song. As previously discussed in conjunction with FIGS. 4 and 5, separate MP3 rips may be made from the same sound recording, and each rip will have a distinct MD5 identifier. On the other hand, the fingerprints generated from multiple rips of the same sound recording will be sufficiently similar to each other as to be identifiable as the same sound recording, and capable of distinguishing from other sound recordings. Accordingly to the example of FIG. 6, therefore, it can be seen that only a single reference fingerprint is required to identify all digital or compressed-digital embodiments of a particular sound recording, whereas multiple MD5 files may be associated with a single sound recording.

The authentication certificate 615 illustrated in FIG. 6 is used as a safety measure to reduce the ability of hackers to use the central index server 101 to exchange copyrighted material. As will be further illustrated in conjunction with FIGS. 7 and 8, when a client computer logs onto the network, a listing of the authenticated digital files within the client 101 is indexed in the central index server 101 so that other clients may identify files within the client 101 which they wish to download. To prevent the exchange of copyrighted files, therefore, each sound recording within a client computer must be identified and authenticated by the central index server 101. Without proper authentication, a data file within the memory of a client will not be listed in the central index file server. The process of identifying and authenticating preferably includes the downloading from the central index server 101 to the client 103 the uniquely assigned song ID 601, 619 which has been assigned to that song, and an authentication certificate. The authentication certificate 615 may be a single value, or a family of digital values and paradigms. The hex code is exemplary of an authentication certificate. An authentication certificate may include an expiration date, beyond which the authentication is no longer valid. Because it is possible for hackers to learn the unique song IDs of select songs and re-embed incorrect song IDs in a particular MP3 file within a client computer to circumvent security measures of the central index server, an authentication certificate may simply be a random value, or digital hash, or may include a cypher or encryption key. The authentication certificate may be added as an additional field within the song certificate 211, be embedded within an MD5 or MP3, or may even be used to scramble some data associated with a file of a sound recording. Embodiments are even envisioned wherein a unique identification certificate is assigned to every file approved for indexing on the central index server, even if files within separate clients are the exact same song ID and same MP3 rip of that song. The essential feature of an authentication certificate is that without it, a file will not be listed within the central index server as available for exchange.

The file status 617 is a value or code indicating the limitations on copying or sharing the file, thereby allowing the central index server 101 to determine a fee or royalty requirement must be collected prior to allowing a file transfer to take place, or deny file sharing altogether for songs that are copy-prohibited as a result of copyright enforcement. File sharing of copy-prohibited is blocked by the central index server 101. Although any number of status are possible, the preferred embodiment will preferably include the categories of copy-free, copy-prohibited and copy-restricted. Copy free files are flagged or free copying over the network through the intermediary facilitation of the central index server 101. Copy-prohibited have been flagged as not available under any circumstance for copying over the network through facilitation of the central index server 101. Copy-restricted files are available for copying with certain restrictions, such as collection of royalty or transaction fee prior to commencement of copying. Copy-restricted files will preferably be further defined by a restriction code 618 or field of codes which defines the specific conditions under which the file may be made available for copying over the network. A data field 620 containing the IP addresses of the client computers currently online which store a valid file of a particular sound recording is seen referenced under the uniquely assigned song ID 601 for a particular song. Embodiments are envisioned, however wherein IP addresses are further defined against MD5 identifies within a particular song ID. An advantage of referencing the IP address for each available MD5 identifier is that, since each different MD5 identifier represents a different rip, possibly made at different settings, if a user client downloads an MP3 file which does not meet with their satisfaction, they can target specific alternate MD5 files, which are respectively referenced against different IP addresses.

Figure 7:
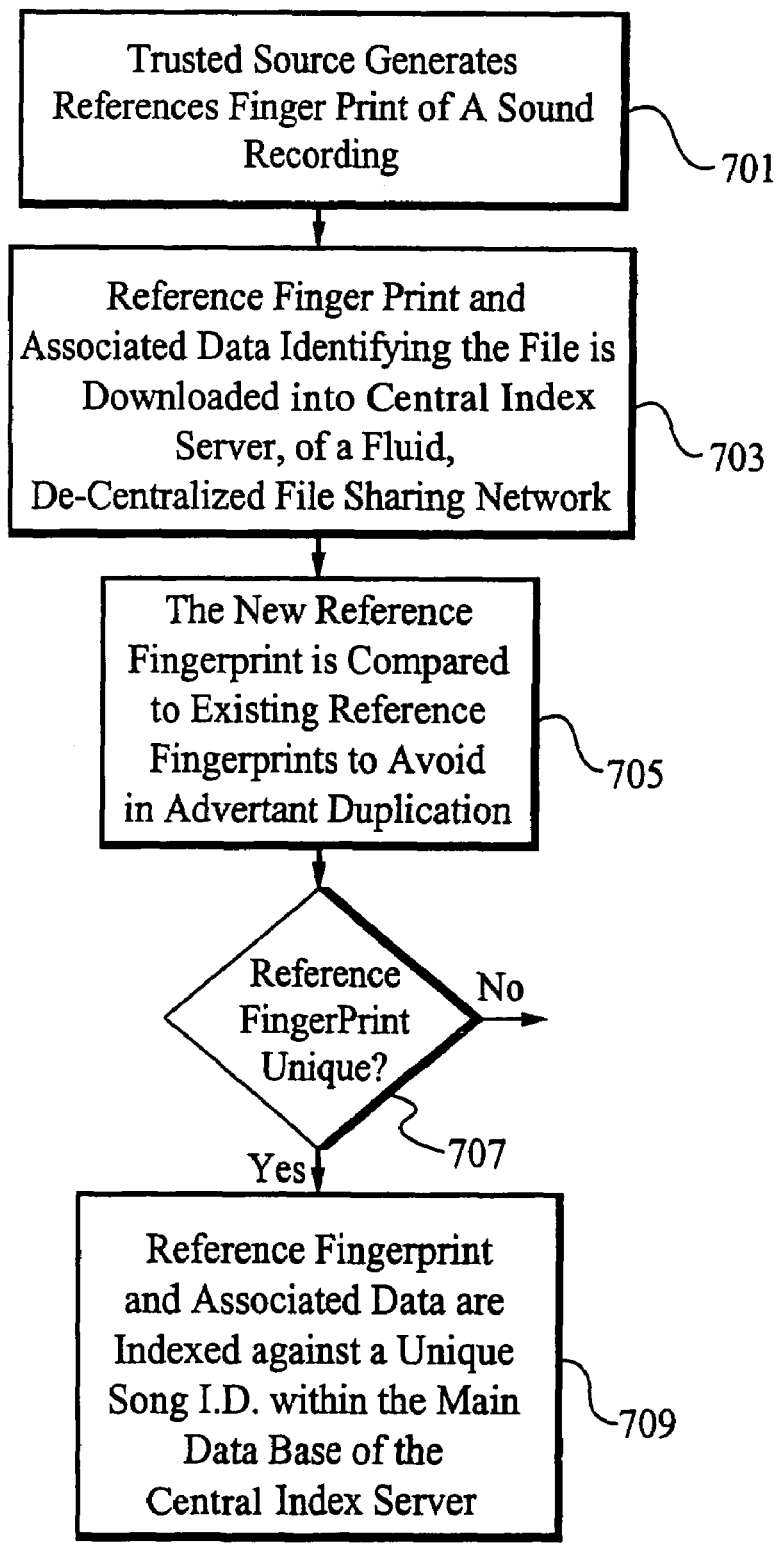
FIG. 7 illustrates a process for establishing a data base of reliable reference fingerprints within a central index server.

FIG. 7 illustrates a flow chart of a sequence of steps for downloading data to form a data base within the central index server according to one embodiment of the present invention. According to the step 701, a trusted source generates a reliable reference fingerprint of a sound recording. According to the prior discussion, a fingerprint of a sound recording is herein understood to mean a digital reduction of a sound recording which reflects sensible (analog) qualities of the sound recording comprising a sufficient amount of data as to make it highly remote that two unrelated sound recordings will generated identical fingerprint values, and which contains substantially less information than the average musical sound recording lasting two minutes, and which is sufficiently impervious to digital alterations of the same underlying sound recording that when multiple fingerprints are generated from multiple quality digital renditions of the same underlying sound recording, the multiple fingerprints will be sufficiently similar so as to identify them as being generated from the same underlying sound recording. Accordingly, any question in authenticity or need to verify a sound recording can be conducted by comparing the fingerprint of an unknown recording against this permanent reference fingerprint. According to the step 703, the reference fingerprint and associated data identifying a particular sound recording is downloaded into the memory of the central index server of a fluid, de-centralized file sharing network. In the step 705, the new fingerprint and data are compared to existing fingerprints in the memory to ensure against inadvertent duplication. If, in the step 707, the reference fingerprint received from the trusted source is unique, then according to the step 709, the reference fingerprint and associated data are indexed against a unique song ID within the main data base of the central index server 101.

Figure 8:
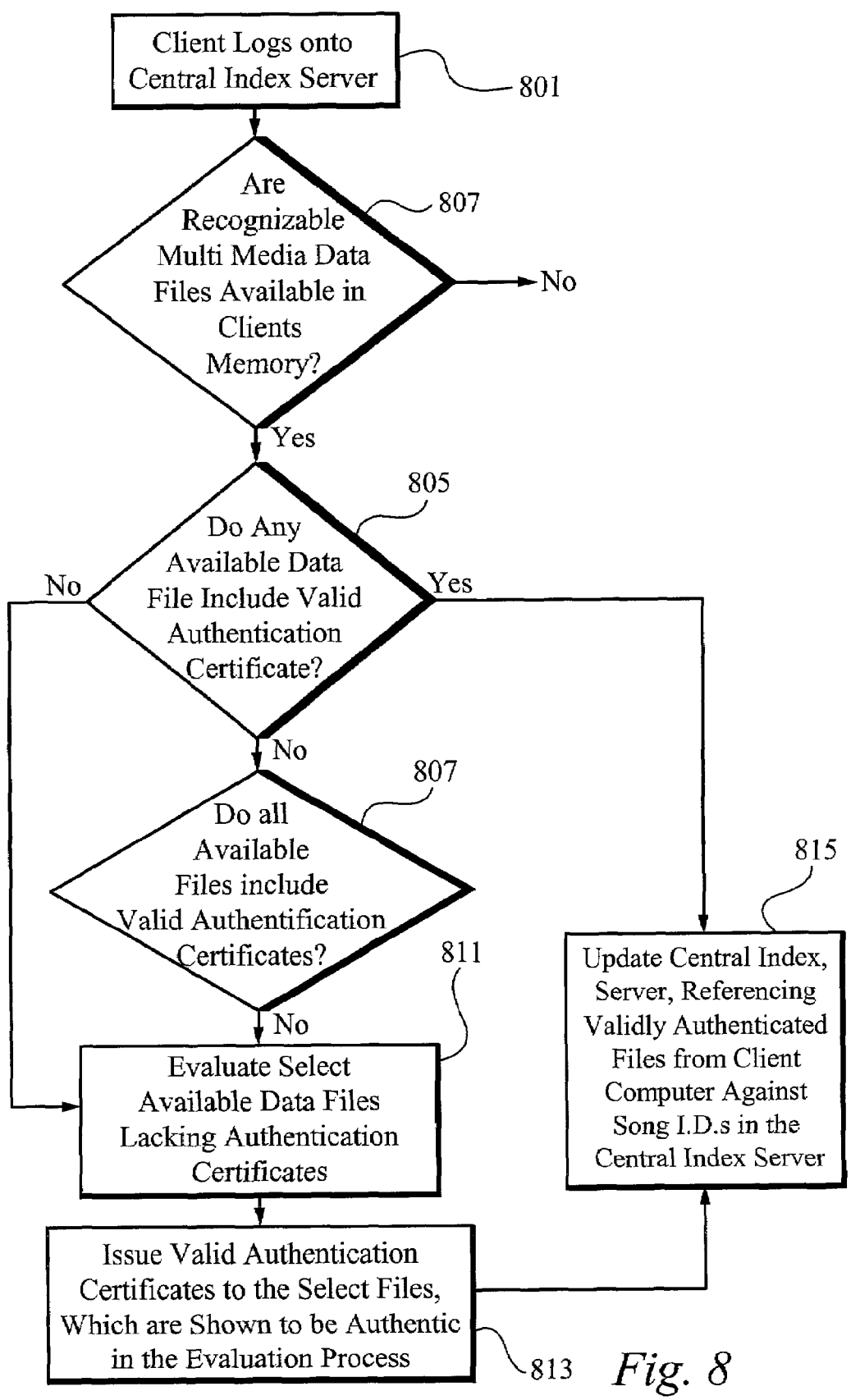
FIG. 8 illustrates a process of isolating non-authenticated data files and marking for authentication during the log on process.

FIG. 8 illustrates a flow chart of one embodiment of a method for updating the central server index when a client computer goes on-line. According to the step 801, the client 103 logs onto the central index server 101. According to the step 803, central index server 101 determines whether or not there are recognizable multi-media data files available in the client memory. If there are recognizable multi-media data files available in the client memory, according to the step 805, the central index server 101 determines of any available data files have unique song IDs and valid authentication certificates issued by the central index server. If no available data files have valid authentication certificates, the process commences to the step 811 discussed below. However, if the client memory contains some valid authenticated data files in an available memory location, according to the step 807, the central index server determines if all of the available files within the client memory have valid authentication certificates. To maintain the attractiveness of a de-centralized file sharing network, it is important that when a client logs on, an inordinate amount of time is not devoted to authenticating every file in the client's memory. Therefore, if not all available files available in the client computer 103 have a valid authentication, according to the step 811, select files within the client computer lacking valid authentication certificates are identified for evaluation and evaluated by the central index server. The purpose of identifying select files rather than identifying all un-authenticated data files relates to the time required to evaluate each file, as further discussed in conjunction with FIG. 9. Because processing speeds for authenticating data files are always changing, no set figure can be established for the number or percent of files authenticated at any one session. However, according to the preferred embodiment, client participation on the de-centralized file sharing network will not be delayed more than a few minutes as a result of the process of identifying select files within the client's memory and performing an authentication on those files. According to an alternative embodiment, however, authentication of client data files will be time-multiplexed to occur "simultaneous" to the client's use of the file sharing services, thereby rendering all delays transparent to the user. In this way, if a client is on-line for an extended period of time soliciting specific files available for sharing, it is possible to authenticate all of the files within the client's memory. According to the step 813, the central index server issues valid authentication certificates to those select data files which pass the evaluation process. In the step 815, the central index server is updated by referencing within the central server the authenticated data files stored within the client computer. The IP address of the client computer is advantageously cross referenced against those data file descriptions stored within the central index server 101, thereby enabling a second client interested in certain files stored within the first client computer to establish a communication link facilitating a file transfer. If, according to the step 807, it is determined that all available files have valid authentication certificates, the process advances directly to the step 815 as previously discussed.

Figure 9:
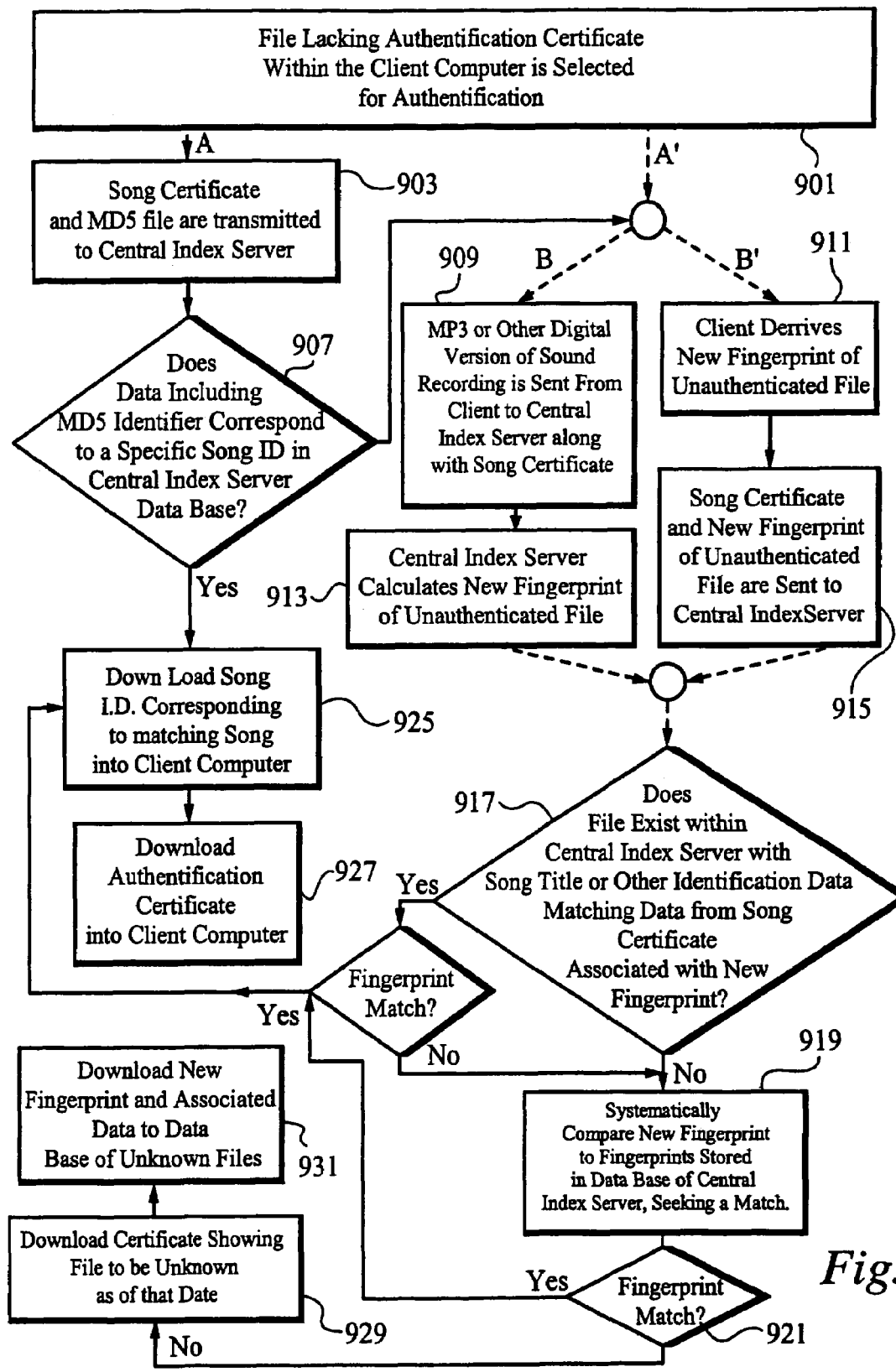
FIG. 9 illustrates a flow chart of a process for authenticating non-authenticated multimedia files within a client computer.

FIG. 9 is an illustration of a process for authenticating a multimedia file such as an MP3 sound recording. The authentication process is required when a client computer is online, and a multimedia file available within the client's memory does not currently possess a valid authentication certificate. Although specific reference is made to files associated with sound recordings, it is understood that the general principles taught in conjunction with FIG. 9 are applicable to the validation of any multimedia file, including sound recordings such as MP3 and video recordings such as MPEG-2, which are exchanged over a fluid, de-centralized, file sharing network. The illustration includes multiple diverging and converging paths illustrated with a dotted line, which represent various embodiments of the present invention. According to the step 901, a file lacking a valid authentication certificate or lacking a song ID is selected for authentication. Because authentication certificates may include an expiration date, a file which includes an expired authentication certificate will require updating. The update process for a file containing an expired certificate may be identical to the remaining steps illustrated in FIG. 9, or may be a much simpler process, such as assigning a new expiration date if the file identified by the expired song certificate is determined to be reliable. The step 901 wherein a particular file or queue of files is selected for authentication, may be performed by the central index server, or may alternatively be performed by the client computer. An advantage of allowing the central index server to perform the file selection is the possibility that another client on-line has requested a file which is not referenced as available by the central index server at that moment. The central index server then has the option of prioritizing the files which it selects for authentication, thereby working to satisfy network demands for specific multimedia files. In the alternative embodiments A and A', the authentication process is begun. According to the step 903, a song certificate including the MD5 identifier of the non-valid file are transmitted from the client to the central index server. It is recalled that different MP3 rips from the same song have different MD5 identifiers, and that, according to the embodiment illustrated in conjunction with FIG. 6, multiple MD5 identifiers corresponding to the same sound recording may be stored in the main database of the central index server 101. By accessing a song of the same title and performing a simple comparison of MD5 files, the authentication process may be performed more quickly than through a probabilistic evaluation of fingerprints as discussed in conjunction with path A'. According to the step 907, the central index server compares the data and MD5 files to data within the main database of the central index server 101. If a match is found, the authentication process may be concluded quickly and efficiently according to the steps 925 wherein a song ID corresponding to the matching song—or other multimedia file—is downloaded into the client computer, and in the step 927, the authentication certificate is also downloaded into the client computer. If, in the step 907, no match is found, it is possible that the MD5 examined is from a new "rip" which was not represented in the file, and that a match may be found through fingerprint analysis. Accordingly, a process of fingerprint comparison is pursued as indicated by path A'. According to the first embodiment B of fingerprint analysis, an MP3 file or other digital version of the sound recording is sent from the client to the central index server, along with identification data such as the song certificate in the step 909. In the step 913, the central index server generates a new fingerprint from the MP3 file. In the embodiment B', the client derives 103 a new fingerprint from the un-authenticated MP3 file according to the step 911. In the step 915, the song certificate and new fingerprint of the unauthenticated file are sent to the central index server 103. The advantage of embodiment B is that, by generating the fingerprint within the central index server 101, a hacker cannot falsely attach a bogus fingerprint of a "copy-free" recording to a copy-restricted sound recording to circumvent system security. An advantage of embodiment B' is that simply uploading a fingerprint is faster and uses less bandwidth than uploading an entire MP3 file or other digital multimedia file.

The step 917 attempts to find a file within the main data base of the central index server is identified that has data matching the song certificate of the new MP3 file. If a match is found, the new fingerprint is compared with the fingerprint of the matching file. If the fingerprints match, according to the step 923, the file is authenticated, as discussed above. If the fingerprints do not match, according to the step 919, the central index server begins a systematic comparison of all fingerprints within the central data base against the new fingerprint. In the step 921, if a match is found, then according to the step 925, the song ID associated with the matching file is downloaded to the client and an authentication certificate is also downloaded. It is instructive to consider the following example. An MP3 file is presented for authentication. The song certificate attached to the MP3 file identifies the song as the 1928 recording of "West End Blues" by New Orleans jazz cornetist Joe "King" Oliver. Assume that the copyright on "West End Blues" has lapsed, and the main data base of the central index server has a listing for Oliver's "West End Blues" and identifies it as "copy-free," reflecting its lapsed copyright. In the step 917, a copy of Joe "King" Oliver's "West End Blues" is located within the main data base of the central index server, and its fingerprint is compared to the new fingerprint. According to the step 923, it is determined that the fingerprints do not match. The central index server then systematically compares the new fingerprint to the various fingerprints within the main data base of the central index server according to the step 919. The new fingerprint is determined to match the reliable fingerprint of Simon & Garfunkel's "The Boxer" in the step 921, which is still copyright protected, and has a status of "copy-restricted." Whether the discrepancy occurred as the result of honest error, or through a hacker attaching the wrong song index to the sound recording to circumvent copyright privileges, is irrelevant. Because the new fingerprint matches the reliable fingerprint for "The Boxer", the song ID for Simon & Garfunkel's "The Boxer" is downloaded to the client for future use in identifying this MP3 file to the central index server. In the step 927, the authentication certificate downloaded to the client will have any terms or restrictions associated with "The Boxer." When the client 103 subsequently logs onto the central index server 101 according to the process illustrated the step 815 of FIG. 8, the identify of the song uploaded into the central index server will be "The Boxer" according to the song ID assigned by the central index server 101 in the step 925. It will be logged accordingly.

It is understood that the authentication certificate may be more than a single value in a field. For example, it may include encrypting the unique song ID and embedding the encrypted value in the MP3 file for comparison with the song ID in the song ID field. The authentication certificate may even involve encrypting the MP3 file itself with an encrypted key derived from the song ID. In this way, if hackers were to change the song ID, it would not conform to the authentication certificate.

An advantage of issuing authentication certificates according to the present invention can be readily understood in light of the need to protect copyright holders in an efficient manner. Because the process of fingerprinting takes time, if a collection of data files such as MP3 sound recordings were to be fingerprinted every time a user went online, the inconvenience of the delay would seriously impede the usefulness of a fluid, de-centralized file sharing network. By authenticating the data files within a client computer only once through a more time consuming process of fingerprint identification or MD5 recognition, and assigning a authentication certificate, the authenticity of the sound recording can be subsequently verified quickly and efficiently during the log in process. By further staggering the issuing of authentication certificates over several sessions, as illustrated in FIG. 8, specifically the step 811, the delay incurred in the initial authentication process can be controlled.

If no match whatsoever is found in the step 921, the new fingerprint and other song data is downloaded into an data base of unknown files. A program analyzes and compares these files, organizing them around related fingerprints. After a sufficient number of fingerprints determined to be the same underlying sound recording are grouped together, the reliability of the ancillary data such as song title, or other song certificate data, is evaluated. If the concord and agreement among the ancillary data is sufficiently high, the song title and data derived from the various song certificates is distilled, and a unique song ID assigned. A representative data set including a representative fingerprint is generated and added to the main data base under the assigned song ID. Because the song identity is not as certain as one received from the reliable source, however, the entry in the main data base is preferably flagged so that it remains subject to more stringent review or updating than the data received from the trusted source. According to a more preferred embodiment, weighted reliability scores are assigned to each song ID entry within the main data base. These weighted scores are able to form the basis for a variety of other factors, including the "shelf life" assigned to an authentication certificate, the urgency of confirming the reliability of a songs identity, or whether or not a song has been identified with sufficient reliability to even add it to the main data base.

By generating unique song ID's and assigning them only when a stringent identification process has been satisfactorily completed, as disclosed in the present invention, the central index server has the ability to identify, catalogue an distinguish virtually every sound recording ever made, and to access an entry for each sound recording file in a minimum amount of time, thereby confirming the copy-protection status quickly and efficiently without imposing an undue delay on the system users. The assignment of song IDs only after a careful comparison and identification against a reliable data base minimizes the likelihood that song IDs will be issued against hacked files. By further including a validation certificate according to the present invention, which includes any of a variety of mechanisms for determining whether a song file with a unique song ID has been hacked, such as including the embedding of encrypted values or keys or algorithms within some portion of the file associated with a sound recording, the present invention is able to minimize the likelihood that a central index server will facilitate file exchanges of copyright or copy protected material on a fluid, de-centralized file sharing network.

What is claimed is:

1. A method of controlling file exchanges of multimedia data files in a de-centralized network comprising a first client, a second client and a central index server with a memory having a main database, the central index server configured to facilitate a connection between the first client and the second client, the method comprising the steps:

a. generating a plurality of reliable identifiers from a respective plurality of known multimedia data files;

b. determining copy restrictions associated with each of the plurality of known multimedia data files, a presence or absence of copy restrictions comprising a status of a known multimedia data file;

c. forming an index within the main database, the index comprising a plurality of unique reference IDs correlating to the plurality of known multimedia data files; and d. indexing each of the plurality of reliable identifiers and corresponding respective statuses against the respective plurality of unique reference IDs within the main database of the central index server, such that the corresponding respective statuses may be individually searched within the central index server.

2. The method according to claim 1 further comprising the steps of:

a. establishing communication between the first client and the central index server;

b. generating a client-file identifier from a first multimedia data file present in the first client, the first multimedia data file comprising ancillary data including user recognizable data; and c. comparing the client-file identifier to a first reliable identifier within the central index server.

3. The method according to claim 2 wherein the first reliable identifier within the central index server is selected according to the steps:

a. indexing sets of ancillary data corresponding to the plurality of known multimedia files, including user-recognizable data, against the respective plurality of unique reference IDs within the main data base of the central index server; and b. selecting a reliable identifier comprising ancillary data corresponding to the ancillary data of the first multimedia data file.

4. The method according to claim 3 further comprising the step of determining that the client-file identifier and the first reliable identifier represent a same underlying performance.

5. The method according to claim 3 further comprising the steps:

a. determining that the client-file identifier and the first reliable identifier do not represent the same underlying performance; and b. systematically comparing the client-file identifier against a remaining sequence of reliable identifiers within the main database of the central index server.

6. The method according to claim 4 further comprising the steps of:

a. identifying a first unique reference ID corresponding to the first reliable identifier; and b. downloading the first unique reference ID from the central index server to the first client following the step of determining that the client-file identifier and the first reliable identifier represent the same underlying performance.

7. The method according to claim 4 further comprising the step of downloading an authentication certificate from the central index server to the first client following the step of determining that the client-file identifier and the first reliable identifier represent the same underlying performance.

8. The method according to claim 6 further comprising the step of downloading an authentication certificate from the central index server to the first client following the step of determining that the client-file identifier and the first reliable identifier represent the same underlying performance.

9. The method according to claim 1 wherein each reliable identifier is a fingerprint of its respective known multimedia file, a fingerprint being generated according to the steps:

a. defining a set of sensible characteristics of a multimedia recording;

b. establishing quantifiable parameters for measuring each of the sensible characteristics;

c. examining the sensible characteristics of the underlying performance; and d. quantifying each of the sensible characteristics of the underlying performance according to the quantifiable parameters.

10. The method according to claim 1 wherein each reliable identifier is a digital hash extracted from its respective multimedia file, the digital hash being generated according to the step of digitally reducing a size of the known multimedia file through a digital reduction algorithm.

11. The method according to claim 6 further comprising the step of:

a. indexing an IP address of the first client against the first reference ID in the main data base;

b. receiving a file request from the second client for a file represented by the unique reference ID;

c. facilitating a connection between the first client and the second client; and d. transferring the first multimedia file from the first client to the second client.

12. The method according to claim 9 wherein the sensible characteristics of the multimedia recording are selected from among a group consisting of tempo, mood, richness, tambour, pitch, frequency, frequency range, beat, key, scales, and amplitude variation.

13. The method according to claim 10 wherein the digital hash is a value derived from an MP3 compression of a sound recording.

14. The method according to claim 7 wherein the authentication certificate is selected from a group consisting of a unique reference ID, a key for encrypting data, a key decrypting data, a date code, and a code generated from an algorithm.

15. The method according to claim 14 wherein the authentication certificate is embedded in a data group selected from a group consisting of an MP3 file, a cryptographic hash value, and a song certificate.

16. The method according to claim 5 further comprising the steps:

a. determining that the client-file identifier does not represent the same performance as any reliable identifier stored within the main data base of the central index server; and b. storing the client-file identifier in a data base of unknown files within the central index server along with ancillary data related to the file identified by the client-file identifier.

17. The method according to claim 16 further comprising the steps:

a. comparing the client-file identifier to other identifiers within the data base of unknown files;

b. determining that some identifiers within the date base of unknown files match in that they represent the same performance;

c. compare other data fields related to matching identifiers; and d. determine a reliability of an identification based upon the degree of agreement among the various data fields related to the matching identifiers.

18. The method according to claim 17 further comprising the steps:
   a. creating a data profile of the underlying performance represented by the matching identifiers, the data profile including a representative identifier; and
   b. indexing the data profile against an unused reference ID within the main data base of the central index server.

19. A method of controlling file exchanges of multimedia data files in a de-centralized network comprising a first client, a second client and a central index server with a memory having a main database containing a plurality of reliable identifiers referenced against a respective plurality of unique reference IDs, the central index server configured to facilitate a connection between the first client and the second client, the method comprising the steps:
   a. establishing a communication between the first client and the central index server;
   b. searching a memory of the first client for usable data files;
   c. identifying a plurality of files which lack authentication certificates issued by the central index server;
   d. generating a first data-file identifier for a first multimedia data file among the plurality of files which lack authentication certificates; and
   e. comparing the first data-file identifier to a first reliable identifier in the main data base of the central index server, the first reliable identifier being separately indexed against both a first unique reference ID and a copy status value.

20. The method according to claim 19 further comprising the steps of:
   searching the copy status value to determine whether the select files are copyright protected.

21. The method according to claim 20 further comprising the steps of:
   a. determining that the first data-file identifier matches the first reliable identifier; and
   b. issuing a valid authentication certificate for the first data file in the client.

22. The method according to claim 21 further comprising the step of referencing an IP address of the first client against the first unique reference ID within the main data base of the central index server.

23. The method according to claim 20 further comprising the steps:
   a. determining that the first data-file identifier does not match the first reliable identifier; and
   b. systematically comparing the first data-file identifier against a remaining plurality of identifiers within the main data base of the control index server.

24. The method according to claim 22 further comprising the steps:
   a. receiving a file request from the second client for a file represented by the first unique reference ID;
   b. facilitating a connection between the first client and the second client; and
   c. transferring the first multimedia data file from the first client to the second client.

25. The method according the claim 23 further comprising the steps:
   a. Determining that the first data-file identifier does not represent a same performance as any reliable identifier stored within the main data base of the central index server; and
   b. storing the first data-file identifier, along with ancillary data related to the first multimedia data file, in a data base of unknown files within the central index server.

26. The method according to claim 25 further comprising the steps:
   a. creating a data profile of an underlying performance represented by the matching identifiers, the data profile including a representative identifier; and
   b. indexing the data profile against an unused reference ID within the main data base of the central index server.

27. The method according to claim 20 wherein the first reliable identifier comprises a fingerprint of a respective multimedia file, a fingerprint being generated according to the steps:
   a. defining a set of sensible characteristics of a multimedia recording;
   b. establishing quantifiable parameters for measuring each of the sensible characteristics;
   c. examining the sensible characteristics of the underlying performance; and
   d. quantifying each of the sensible characteristics of the underlying performance according to the quantifiable parameters.

28. The method according to claim 20 wherein the first reliable identifier is a digital hash extracted from a respective multimedia file, the digital hash being generated according to the step of digitally reducing a size of the known multimedia file through a digital reduction algorithm.

29. The method according to claim 27 wherein the sensible characteristics of the multimedia recording are selected from among a group consisting of tempo, mood, richness, tambour, pitch, frequency, frequency range, beat, key, scales, and amplitude variation.

30. The method according to claim 28 wherein the digital hash is an MD5 value derived from an MP3 compression of a sound recording.

31. A method of controlling file exchanges of multimedia data files in a de-centralized network, comprising:
   providing a first client and a second client;
   providing a central index server with a memory including a main database, the central index server configured to facilitate a connection between the first client and the second client;
   generating a plurality of reliable identifiers from a respective plurality of known multimedia data files;
   determining copy restrictions associated with each of the plurality of known multimedia data files, wherein each copy restriction is associated with a field of codes that define specific conditions under which a known multimedia data file may be made available for copying, a presence or absence of copy restrictions corresponding to a status of a known multimedia data file;
   forming an index within a main database of the central index server, the index comprising a plurality of unique reference IDs correlating to the plurality of known multimedia data files; and
   indexing each of the plurality of reliable identifiers and corresponding respective statuses against the respective plurality of unique reference IDs within the main database of the central index server, such that the corresponding respective statuses may be individually searched within the central index server.

* * * * *